(12) United States Patent
Sharpe

(10) Patent No.: US 11,905,091 B2
(45) Date of Patent: Feb. 20, 2024

(54) PACKAGED FOOD

(71) Applicant: Frito-Lay Trading Company GmbH, Bern (CH)

(72) Inventor: Mike Sharpe, Leicester (GB)

(73) Assignee: Frito-Lay Trading Company GmbH, Bern (CH)

( * ) Notice: Subject to any disclaimer, the term of this patent is extended or adjusted under 35 U.S.C. 154(b) by 576 days.

(21) Appl. No.: 17/260,437

(22) PCT Filed: Sep. 19, 2019

(86) PCT No.: PCT/EP2019/075219
§ 371 (c)(1),
(2) Date: Jan. 14, 2021

(87) PCT Pub. No.: WO2020/058429
PCT Pub. Date: Mar. 26, 2020

(65) Prior Publication Data
US 2021/0261316 A1    Aug. 26, 2021

(30) Foreign Application Priority Data
Sep. 20, 2018   (GB) ...................................... 1815349

(51) Int. Cl.
*B65D 75/56* (2006.01)
*B32B 3/04* (2006.01)
(Continued)

(52) U.S. Cl.
CPC ............. *B65D 75/563* (2013.01); *B32B 3/04* (2013.01); *B32B 7/12* (2013.01); *B32B 27/08* (2013.01);
(Continued)

(58) Field of Classification Search
CPC ...... B65D 75/563; B65D 75/26; B65D 75/46; B65D 75/5805; B65D 75/5827;
(Continued)

(56) References Cited

U.S. PATENT DOCUMENTS

| 5,054,619 | A | 10/1991 | Muckenfuhs |
| 5,361,905 | A | 11/1994 | McQueeny |
| 2016/0137374 | A1* | 5/2016 | Brosch ................. B65D 33/007 383/104 |

FOREIGN PATENT DOCUMENTS

| DE | 102014010987 | 9/2015 |
| EP | 1707496 | 10/2006 |

(Continued)

OTHER PUBLICATIONS

International Search Report dated Jan. 16, 2020 in PCT/EP2019/075219.
Written Opinion dated Jan. 16, 2020 in PCT/EP2019/075219.

*Primary Examiner* — Brent T O'Hern
(74) *Attorney, Agent, or Firm* — Barnes & Thornburg LLP; G. Peter Nichols

(57) ABSTRACT

A packaged food that includes a sealed bag defining therein a sealed cavity containing a food, the sealed bag being formed from a flexible packaging film that includes a monoaxially oriented polymeric layer defining a preferential tear direction extending along the film; wherein the packaging film is configured to form first and second elongate tear-away portions of the sealed bag which are on opposite sides of, and adjacent to, an elongate central portion of the sealed bag, the first and second elongate tear-away portions and the elongate central portion extending along the preferential tear direction, whereby tearing away of the first and second elongate tear-away portions along the preferential
(Continued)

tear direction to open the sealed bag leaves the elongate central portion forming a handle portion of the opened bag.

18 Claims, 2 Drawing Sheets

(51) Int. Cl.
 *B32B 7/12*   (2006.01)
 *B32B 27/08*   (2006.01)
 *B32B 27/32*   (2006.01)
 *B65D 75/26*   (2006.01)
 *B65D 75/46*   (2006.01)
 *B65D 75/58*   (2006.01)

(52) U.S. Cl.
 CPC ............ *B32B 27/32* (2013.01); *B65D 75/26* (2013.01); *B65D 75/46* (2013.01); *B65D 75/5805* (2013.01); *B65D 75/5827* (2013.01); *B32B 2250/242* (2013.01); *B32B 2255/10* (2013.01); *B32B 2255/205* (2013.01); *B32B 2307/31* (2013.01); *B32B 2307/412* (2013.01); *B32B 2307/516* (2013.01); *B32B 2307/518* (2013.01); *B32B 2307/546* (2013.01); *B32B 2307/582* (2013.01); *B32B 2307/75* (2013.01); *B32B 2439/46* (2013.01); *B32B 2439/70* (2013.01); *B65D 2575/56* (2013.01); *B65D 2575/58* (2013.01)

(58) Field of Classification Search
 CPC .. B65D 2575/56; B65D 2575/58; B32B 3/04; B32B 7/12; B32B 27/08; B32B 27/32; B32B 2250/242; B32B 2255/10; B32B 2255/205; B32B 2307/31; B32B 2307/412; B32B 2307/516; B32B 2307/518; B32B 2307/546; B32B 2307/582; B32B 2307/75; B32B 2439/46; B32B 2439/70
 USPC ........................................................ 426/123
 See application file for complete search history.

(56) References Cited

FOREIGN PATENT DOCUMENTS

| | | |
|---|---|---|
| EP | 2614013 | 7/2013 |
| GB | 2472691 | 2/2011 |
| JP | 2008230658 | 10/2008 |

* cited by examiner

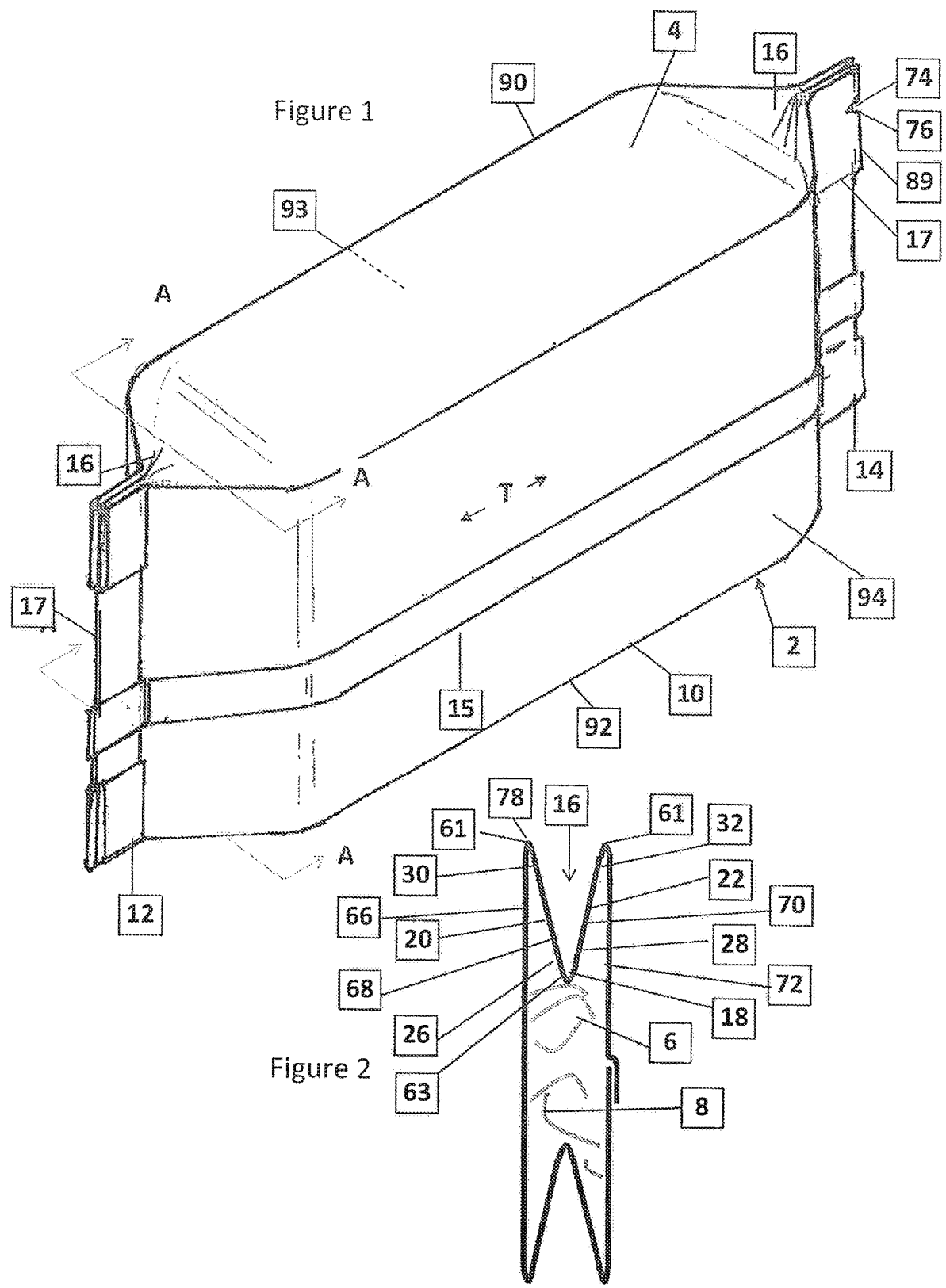

PACKAGED FOOD

The present invention relates to a packaged food. The present invention in particular relates to a packaged snack food in which the packaging is configured to be more convenient to the consumer when used for serving food from the opened package.

A variety of different packages for food, in particular snack food, is known in the art. Typically, snack foods, such as potato chips or crisps, are packaged in bags composed of flexible packaging film, for example bags having opposite sealed ends and produced by a vertical form, fill and seal (VFFS) machine.

There is a general need in the art for packages for food, in particular snack food which can have increased functionality and appeal to the consumer. Recently, packages containing larger snack food amounts, i.e. containing more than one typical portion of snack food to be consumed by a single consumer, have been marketed as "sharing packs" to enable the consumer to have a shared snacking experience.

There is a particular need in the art for an improved sharing pack, which can give an enhanced consumer experience and be more convenient for the consumer to use where more than one person wishes to take food from the opened pack.

The present invention accordingly provides a packaged food.

The present invention also provides a laminated polymer flexible packaging.

Optional and/or preferred features are defined in the dependent claims.

Preferred embodiments of the present invention will now be described by way of example only with reference to the accompanying drawings, in which:

FIG. 1 is a schematic perspective view of a packaged snack food, prior to opening the package, in accordance with an embodiment of the present invention;

FIG. 2 is a schematic cross-section along line A-A the packaged snack food of FIG. 1;

Figure 3:
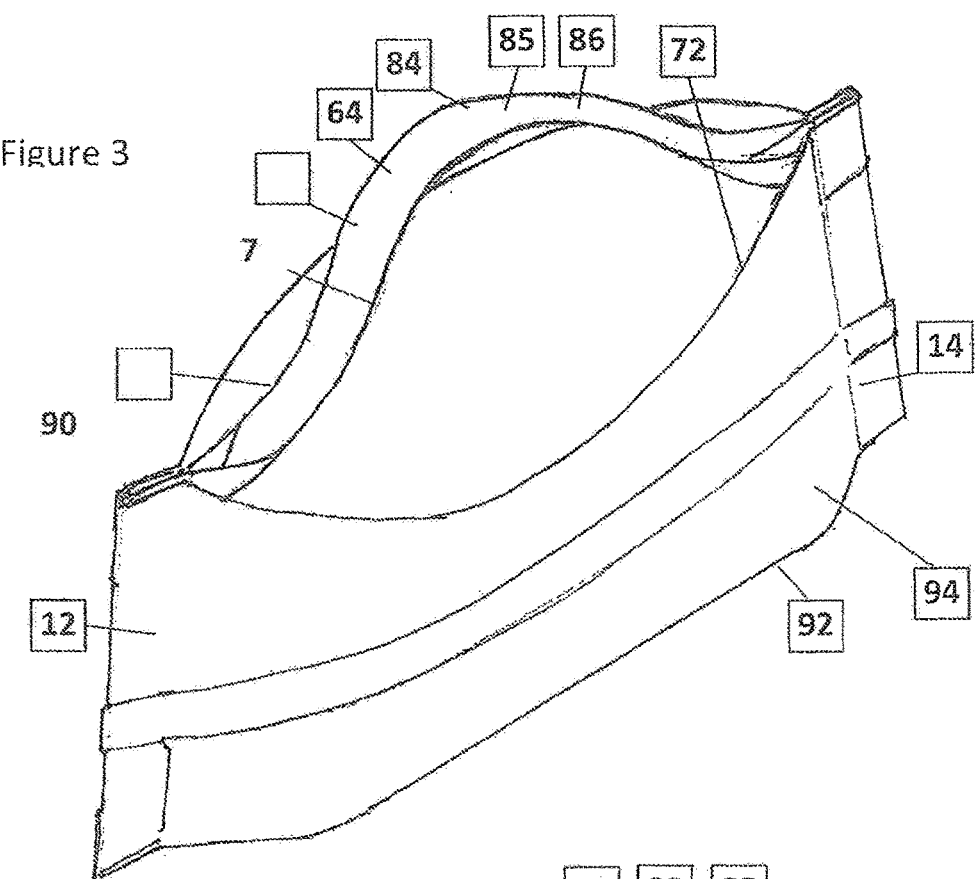
FIG. 3 is a schematic perspective view of the packaged snack food of FIG. 1 after opening the package.
Figure 4:
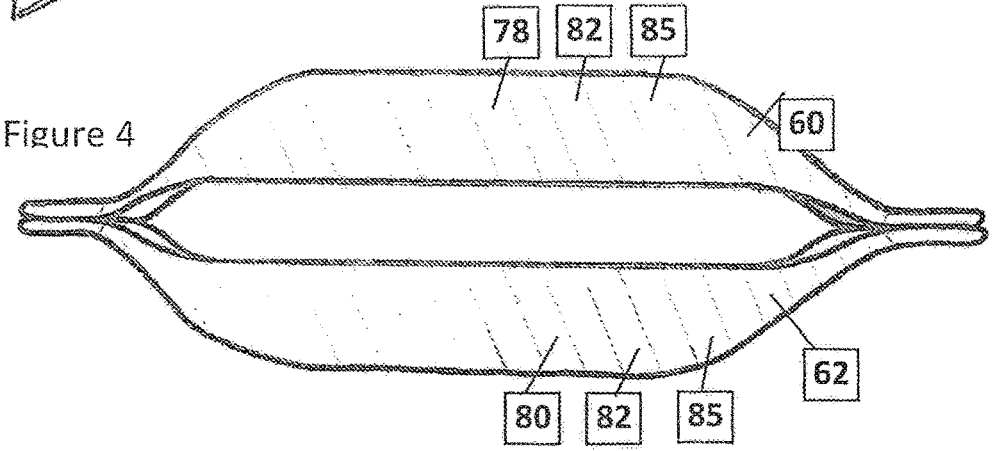
FIG. 4 is a schematic perspective side view of a torn-away part of the packaging film of the packaged food which is formed by opening the packaged food of FIG. 1.

Referring to FIGS. 1 to 4, a packaged food, in particular for snack food, designated generally as 2, comprises a sealed bag 4. The sealed bag 4 defines therein a sealed cavity 6 containing a food 8. Preferably the food 8 comprises snack food, for example potato chips, potato crisps, tortilla chips, snack chips, nuts, or fried or baked snack food pieces. The packaged food may comprise a single portion of snack food, typically having a portion weight of from 20 to less than 75 grams, depending upon the particular snack food that is packaged, and the packaged food may be sold as an individual pack. Alternatively, the packaged food may comprise multiple portions of snack food, typically having a total weight of greater than 75 grams, depending upon the particular snack food that is packaged, and the packaged food may be sold as a sharing pack. In FIG. 2 the snack food 8 is potato chips.

The sealed bag 4 is formed from a flexible packaging film 10 using a conventional bag making process used in the snack food industry, for example using a form, fill and seal machine and an associated form, fill and seal process. The sealed bag 4 is typically a pillow pack formed by a form, fill and seal process.

The sealed bag 4 has opposite sealed ends 12, 14, which are preferably heat sealed, which is conventional in the manufacture of flexible bags for snack foods. A longitudinal seal 15, preferably a heat seal 15, extends between the first and second sealed ends 12, 14.

The opposite sealed ends 12, 14, each comprise a respective sealed flange 17 in which a plurality of layers of the packaging film 10 are heat sealed together. The first and second sealed ends 12, 14 each include a respective folded gusset 16 formed from the packaging film 10. Each gusset 16 has an inward folded edge 18 and opposite first and second inner walls 20, 22 extending outwardly from the inward folded edge 18. Each of the first and second inner walls 20, 22 has a respective lower portion 26, 28 adjacent to the inward folded edge 18 and a respective upper portion 30, 32.

Figure 5:
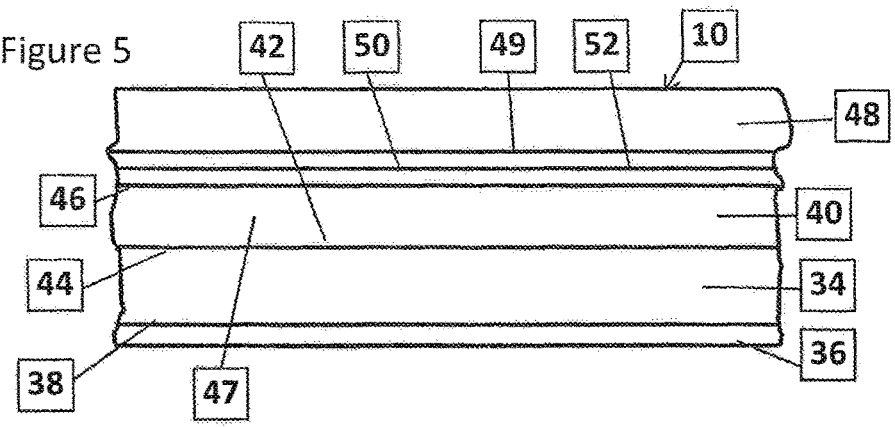
FIG. 5 is a cross-section through a packaging film for forming the packaged food of FIG. 1.

Referring to FIG. 5, in which the layer thicknesses are schematic and not to scale, the packaging film 10 is a laminated polymer film 10 which comprises a monoaxially oriented polymeric layer 34 which is a machine-rolled polymer film having a machine direction. The monoaxially oriented polymeric layer 34 is preferably a polypropylene layer. A preferential tear direction is oriented along the machine direction of the monoaxially oriented polymeric layer 34. A heat seal layer 36 forms a coating on a first surface 38 of the monoaxially oriented polymeric layer 34. A barrier layer 40 has a rear surface 42 which covers a second surface 44, opposite to the first surface 38, of the monoaxially oriented polymeric layer 34. The barrier layer 40 preferably comprises a metallized coating 46 on a polypropylene layer 47. A printed layer 48 covers a front surface 50, opposite to the rear surface 42, of the barrier layer 40. The printed layer 48 preferably comprises a transparent polypropylene layer, and is reverse printed on the rear surface 49 thereof. Preferably, the packaging film 10 further comprises an adhesive layer 52 which adheres the printed layer 48 to the barrier layer 40. Preferably, at least one or both of the barrier layer 40 and the printed layer 48 is biaxially oriented.

During manufacture of the sealed bag from the packaging film 10, using a conventional form, fill and seal process, the packaging film 10 is folded to form a tube and the longitudinal seal 15 is formed by heat sealing. One of the sealed ends 12, 14 is formed by heat sealing plural layers of the packaging film 10 to form the flange 17. The heat sealing is carried out by sealing together heat seal layers 36 on folded-together parts of the packaging film 10. Then a measured portion of the food 8 is deposited into the sealed tube and thereafter the other of the sealed ends 12, 14 is formed by heat sealing. This forms the sealed cavity 6 containing the food 8.

The present invention provides a specific structure to enable the bag 4 to be opened to form an integral handle portion in the bag 4, the handle portion being formed from the packaging film 10.

The monoaxially oriented polymeric layer 34 defines a preferential tear direction T extending along the packaging film 10. The packaging film 10 is oriented in the sealed bag 6 so that the preferential tear direction T extends between the first and second sealed ends 12, 14.

The packaging film 10 forms first and second elongate tear-away portions 60, 62 of the sealed bag 4 which are on opposite sides of, and adjacent to, an elongate central portion 64 of the sealed bag 4. The first and second elongate tear-away portions 60, 62 and the elongate central portion 64 extend along the preferential tear direction T. The first and second elongate tear-away portions 60, 62 and the elongate central portion 64 extend between, and are connected to, the opposite first and second sealed ends 12, 14.

The first elongate tear-away portion 60 is defined between first and second mutually spaced tear lines 66, 68 extending along the preferential tear direction T, and the second elongate tear-away portion 62 is defined between third and fourth mutually spaced tear lines 70, 72 extending along the preferential tear direction T. The elongate central portion 64 is defined between the second and third tear lines 68, 70, which are mutually spaced.

The first, second, third and fourth tear lines 66, 68, 70, 72 are virtual tear lines extending away from at least one physical tear initiation element 74 formed in the packaging film 10 and located at least one end of the tear lines 66, 68, 70, 72. The physical tear initiation element 74 preferably comprises a weakening, for example a cut 76 which is preferably linear and/or in the form of a notch, formed in the packaging film 10. For example flange 17, which is remote from the sealed cavity 8. In the illustrated embodiment, the weakening 74, embodied by cut 76, is formed in at least one of the sealed ends 12, 14, and preferably comprises a notch 76 cut into an edge 89 of a flange 17 of the respective sealed end 12, 14.

The cut 76 is located relative to the depth of the folded gussets 16 so that, in an action to open the sealed bag 4, when tearing of the packaging film 10 along the preferential tear direction T is initiated by tearing along the direction of the cut 76, opposite uppermost portions 78, 80 of the folded gussets 16, and any intermediate portion 82 of the sidewall 85 of the sealed bag 4 therebetween, are torn away in a common tearing action. The tearing action leaves a lowermost portion 84 of the folded gussets 16, and any intermediate portion 86 of sidewall 84 of the sealed bag 4 therebetween, still connected to the opposite sealed ends 12, 14 of the now-opened bag 4. The lowermost portion 84, and any intermediate portion 86, forms the elongate central portion 64 which extends along the preferential tear direction T and can function as a handle portion 65 for the opened bag 4.

The elongate central portion 64 includes the inward folded edge 18 and opposite lower portions 26, 28 of the first and second walls 20, 22 and the first and second elongate tear-away portions 62 include opposite upper portions 30, 32 of the first and second walls 20, 22.

A common physical tear initiation element 74 is located at one of the first and second sealed ends 12, 14, whereby tearing along the single common physical tear initiation element 74 causes the packaging film 10 to be torn along the first, second, third and fourth tear lines 66, 68, 70, 72 to separate the first and second elongate tear-away portions 60, 62 from the elongate central portion 64 which remains between the first and second sealed ends 12, 14.

Preferably, the elongate central portion 64 is spaced from the longitudinal seal 15.

The folded gussets 16 form one side 90 of the sealed bag 4. An opposite side 92 of the sealed bag 4 may also optionally be provided with folded gussets (not shown). On opposite sides of the folded gussets 16, outer front and rear sidewalls 93, 94 of the sealed bag 4 extend between the opposite sides 90, 92. At the folded gussets 16, four layers of the packaging film 10 are sealed together, the four layers forming the front sidewall 92, the first and second inner walls 20, 22, and the rear sidewalls 94. The cut 76 extends through these four layers of the packaging film 10.

In order to open the sealed bag 4, a user simply pulls along the cut 76 located at the sealed end 12. This tearing action causes the four layers of the packaging film 10 to be simultaneously torn along the preferential tear direction T in a common tearing action. The first and second elongate tear-away portions 60, 62 are torn away, leaving the elongate central portion 64 which extends along the preferential tear direction T and can function as a handle portion 65 for the opened bag 4.

The cut 76 is located between the top and bottom edges 61, 63 of the folded gussets 16 so that when the flexible packaging film 10 is torn at the cut 76, the tearing extends along the preferential tear direction T simultaneously through four layers of the flexible packaging film 10 thereby to tear away the outer first and second elongate tear-away portions 60, 62, which are above the cut 76, leaving the elongate central portion 64, which is below the cut 76.

The now-opened side 90 of the bag 4 can function as the opened top of the bag for access to the snack food therein. The opposite side 92 of the bag 4 can function as a base which is placed on a support surface.

The sealed bag 4 may optionally be provided with printed instructions on how the consumer is to open the bag; for example, the wording "tear here" or similar wording may be printed in the vicinity of the cut 76.

The first, second, third and fourth tear lines 66, 68, 70, 72 are virtual tear lines, since they are not formed until the packaging film 10 is actually torn but they are virtually present since the structural combination of the cut 76 and the preferential tear direction T in the packaging film 10, embodied by the monoaxially oriented polymeric layer defining the preferential tear direction T extending along the packaging film 10, defines the location of the tear lines 66, 68, 70, 72 prior to the tearing action. Preferably, there is no physical marking, for example printing or embossing of the packaging film 10, of the first, second, third and fourth tear lines 66, 68, 70, 72. Therefore the efficacy of the packaging film 10 to hermetically seal and protect the packaged food in the sealed cavity 6 is not compromised. The cut 76 is formed in the sealed end 12 remote from the sealed cavity 6, and so the sealing of the sealed cavity 6 is not compromised by the cut 76.

The preferred embodiments of the present invention can provide a packaged snack food in which the packaging is configured to be more convenient to the consumer when used for serving food from the opened package.

The preferred embodiments of the present invention can provide an improved sharing pack for snack foods, which can give an enhanced consumer experience and be more convenient for the consumer to use where more than one person wishes to take food from the opened pack.

The preferred embodiments of the present invention can provide a handle portion in a flexible bag which is formed from the packaging film used to form the bag, which is typically a pillow pack formed by a form, fill and seal process. No additional material is used to form the handle portion.

Prior to opening the sealed bag, the handle portion is "hidden" but is integrally present in the packaging film of the bag, as a result of the provision of a preferential tear direction and the tear initiation element, such as the cut.

The opening of the sealed bag provides by tearing along the tear initiation element provides the consumer with a surprising and delightful experience of revealing a previously "hidden" handle portion within the bag.

Various modifications can be made to the above-described embodiment without departing from the scope of the present invention, which is defined by the claims.

The invention claimed is:

1. A packaged food, the packaged food comprising: a sealed bag defining therein a sealed cavity containing a food, the sealed bag being formed from a packaging film comprising a monoaxially oriented polymeric layer defining a preferential tear direction extending along the film; wherein the packaging film is configured to form first and second elongate tear-away portions of the sealed bag which are on opposite sides of, and adjacent to, an elongate central portion of the sealed bag, the first and second elongate tear-away portions and the elongate central portion extending along the preferential tear direction, whereby tearing away of the first and second elongate tear-away portions along the preferential tear direction forms an opened bag and leaves the elongate central portion forming a handle portion of the opened bag.

2. The packaged food according to claim 1, wherein the first elongate tear-away portion is defined between a first tear line and a second tear line spaced from the first tear line and extending along the preferential tear direction, the second elongate tear-away portion is defined between a third tear line and a fourth tear lines spaced from the third tear line and extending along the preferential tear direction, and the elongate central portion is defined between the second and third tear lines, which are mutually spaced.

3. The packaged food according to claim 2, wherein the first, second, third and fourth tear lines are virtual tear lines which are formed only after the packaging film is torn.

4. The packaged food according to claim 2, wherein the first, second, third and fourth tear lines extend away from at least one physical tear initiation element formed in the packaging film and located at least one end of the first, second, third, and fourth tear lines, respectively.

5. The packaged food according to claim 4, wherein the at least one physical tear initiation element comprises a weakening formed in the packaging film which is remote from the sealed cavity, optionally wherein the weakening comprises a cut formed in the packaging film which is remote from the sealed cavity.

6. The packaged food according to claim 1, wherein the sealed bag has opposite first and second sealed ends, and the first and second elongate tear-away portions and the elongate central portion each extend between, and are connected to, the opposite first and second sealed ends.

7. The packaged food according to claim 1, wherein the sealed bag has opposite first and second sealed ends, and the first and second elongate tear-away portions and the elongate central portion each extend between, and are connected to, the opposite first and second sealed ends and wherein a weakening is formed in at least one of the opposite first and second sealed ends.

8. The packaged food according to claim 6, wherein the opposite first and second sealed ends are heat sealed and comprise a respective sealed flange in which a plurality of layers of the packaging film are heat sealed together.

9. The packaged food according to claim 6, wherein the opposite first and second sealed ends each include a respective folded gusset formed from the packaging film, each gusset having an inward folded edge and opposite first and second walls extending outwardly from the inward folded edge, each of the opposite first and second walls having a respective lower portion adjacent to the inward folded edge and a respective upper portion, wherein the elongate central portion includes the inward folded edge and opposite lower portions of the opposite first and second walls and the first and second elongate tear-away portions include opposite upper portions of the opposite first and second walls.

10. The packaged food according to claim 6, wherein the opposite first and second sealed ends each include a respective folded gusset formed from the packaging film, each gusset having an inward folded edge and opposite first and second walls extending outwardly from the inward folded edge, each of the first and second walls having a respective lower portion adjacent to the inward folded edge and a respective upper portion, wherein the elongate central portion includes the inward folded edge and opposite lower portions of the first and second walls and the first and second elongate tear-away portions include opposite upper portions of the first and second walls and wherein a common physical tear initiation element is located at one of the opposite first and second sealed ends, whereby tearing along the single common physical tear initiation element causes the packaging film to be torn along the first, second, third and fourth tear lines to separate the first and second elongate tear-away portions from the elongate central portion which remains between the opposite first and second sealed ends.

11. The packaged food according to claim 10, wherein the common physical tear initiation element comprises a notch cut into an edge of the one of the opposite first and second sealed ends.

12. The packaged food according to claim 11, further comprising a longitudinal seal, optionally a heat seal, extending between the opposite first and second sealed ends and wherein the elongate central portion is spaced from the longitudinal seal.

13. The packaged food according to claim 1, wherein the monoaxially oriented polymeric layer is a machine-rolled polymer film having a machine direction and the preferential tear direction is oriented along the machine direction, optionally wherein the monoaxially oriented polymeric layer is a polyolefin layer, optionally a polypropylene layer.

14. The packaged food according to claim 13, further comprising a heat seal layer which forms a coating on a rear surface, facing inwardly towards the cavity, of the monoaxially oriented polymeric layer.

15. The packaged food according to claim 3, further comprising a barrier layer which covers a front surface, facing outwardly away from the cavity, of the monoaxially oriented polymeric layer, optionally wherein the barrier layer comprises a metallized polypropylene layer, optionally which is biaxially oriented.

16. The packaged food according to claim 15, further comprising a printed layer which covers a front surface, facing outwardly away from the cavity, of the barrier layer, optionally wherein the printed layer comprises a transparent polypropylene layer, optionally which is biaxially oriented, the transparent polypropylene barrier layer being printed on a rear surface, facing inwardly towards the cavity, thereof.

17. The packaged food according to claim 1, wherein the handle portion includes (a) a first end and a second end, each connected to opposite first and second ends of the opened bag, respectively, and (b) a central portion spaced from an open side of the opened bag.

18. The packaged food according to claim 1, wherein the food comprises snack food, optionally wherein the packaged snack food comprises potato chips, potato crisps, tortilla chips, snack chips, nuts, or fried or baked snack food pieces, further optionally wherein the packaged food comprises either a single portion of snack food having a portion weight of from 20 to less than 75 grams, or multiple portions of snack food having a total weight of greater than 75 grams.

* * * * *